US012447448B2

(12) United States Patent
Føns

(10) Patent No.: US 12,447,448 B2
(45) Date of Patent: Oct. 21, 2025

(54) MAGNETICALLY-COUPLED LIQUID MIXER

(71) Applicant: ALFA LAVAL CORPORATE AB, Lund (SE)

(72) Inventor: Michael Juhl Føns, Hinnerup (DK)

(73) Assignee: ALFA LAVAL CORPORATE AB, Lund (SE)

( * ) Notice: Subject to any disclaimer, the term of this patent is extended or adjusted under 35 U.S.C. 154(b) by 944 days.

(21) Appl. No.: 17/297,008

(22) PCT Filed: Nov. 22, 2019

(86) PCT No.: PCT/EP2019/082256

§ 371 (c)(1),
(2) Date: May 26, 2021

(87) PCT Pub. No.: WO2020/109167

PCT Pub. Date: Jun. 4, 2020

(65) Prior Publication Data

US 2022/0023810 A1 Jan. 27, 2022

(30) Foreign Application Priority Data

Nov. 29, 2018 (EP) .................................... 18209087

(51) Int. Cl.
*B01F 33/453* (2022.01)
*B01F 23/43* (2022.01)
*B01F 27/91* (2022.01)

(52) U.S. Cl.
CPC .......... *B01F 33/4535* (2022.01); *B01F 23/43* (2022.01); *B01F 27/91* (2022.01); *B01F 33/4533* (2022.01)

(58) Field of Classification Search
CPC .............. B01F 33/4533; B01F 33/4535; B01F 33/4532
See application file for complete search history.

(56) References Cited

U.S. PATENT DOCUMENTS 2,810,556 A 10/1957 Zozulin
4,147,437 A * 4/1979 Jonqueres ............. B01F 27/113 416/243

(Continued)

FOREIGN PATENT DOCUMENTS

CN 105854664 A 8/2016
DE 102005010753 A1 * 3/2006 .......... B01F 13/0827

(Continued)

OTHER PUBLICATIONS

English translation of KR100917901B1, Yeum, Obtained Mar. 7, 2024 from <https://worldwide.espacenet.com > (Year: 2024).*

(Continued)

*Primary Examiner* — Claire X Wang
*Assistant Examiner* — Patrick M McCarty
(74) *Attorney, Agent, or Firm* — BUCHANAN INGERSOLL & ROONEY PC

(57) ABSTRACT

A magnetically-coupled liquid mixer has axial and radial directions, and comprises: a drive mount to be secured to a wall of a mixing tank and having a stationary closed-end cylindrical casing arranged in the axial direction and configured for protruding into the tank, a tank-external drive rotor having a rotatable first magnet array and configured to be inserted in the cylindrical casing, and an impeller configured for being rotatably-mounted on the cylindrical casing and having a plurality of radially extending blades and a second magnet array. The first and second magnet arrays in an assembled state of the mixer are configured for enabling rotary torque to be transferred from the drive rotor to the impeller by magnetic coupling between the first and second magnet arrays. An upper portion of at least one blade is curved/angled in an intended direction of rotation to help move liquid axially downwards during impeller rotation.

20 Claims, 8 Drawing Sheets

(56) References Cited

U.S. PATENT DOCUMENTS

| | | | | |
|---|---|---|---|---|
| 5,316,443 | A | 5/1994 | Smith | |
| 5,393,142 | A * | 2/1995 | Meier | B01F 33/4535 366/314 |
| 5,407,272 | A | 4/1995 | Meier | |
| 6,206,562 | B1 * | 3/2001 | Eyraud | B01F 33/453 366/273 |
| 7,396,153 | B2 | 7/2008 | Andersson | |
| 7,421,929 | B2 | 9/2008 | French | |
| 8,128,277 | B2 | 3/2012 | Meier | |
| 9,416,664 | B2 | 8/2016 | Kawai et al. | |
| 10,357,748 | B2 * | 7/2019 | Rozy | F16C 39/066 |
| 2004/0076076 | A1 * | 4/2004 | Hoobyar | B01F 33/453 366/273 |
| 2007/0036027 | A1 | 2/2007 | Meier | |
| 2009/0231952 | A1 | 9/2009 | Higbee et al. | |
| 2010/0309746 | A1 | 12/2010 | Andersson | |
| 2011/0091961 | A1 * | 4/2011 | Haberkorn | B01F 27/91 435/283.1 |
| 2012/0243366 | A1 * | 9/2012 | Johansson | F16C 32/0427 366/273 |
| 2014/0193268 | A1 | 7/2014 | Kawai et al. | |
| 2018/0117544 | A1 | 5/2018 | Zheng et al. | |

FOREIGN PATENT DOCUMENTS

| | | | |
|---|---|---|---|
| DE | 202013012407 | U1 | 10/2016 |
| EP | 0399972 | B1 * | 4/1993 |
| EP | 1470856 | B1 | 8/2006 |
| JP | 2000-015075 | A | 1/2000 |
| KR | 10-0917901 | B1 | 9/2009 |
| KR | 10-2010-0126276 | A | 12/2010 |
| KR | 10-2018-0113270 | A | 10/2018 |
| WO | 2017037156 | A1 | 3/2017 |

OTHER PUBLICATIONS

Office Action (Text of First Office Action) issued Jul. 29, 2022, by the State Intellectual Property Office of People's Republic of China in corresponding Chinese Patent Application No. 201980078768.1 and an English Translation of the Office Action. (16 pages).

Brochure, "AMT-Magnetic Mixer AMO-Homogenizer, Sanitary Flow Equipment," Sanitary Line Bollettino TM-15, Aerre Inox s.r.l., Fiesco, Cremona; exact publication date unknown, but at least as early as Aug. 2, 2018. (6 pages).

Brochure, "Zeta magnetic agitator—for applications in sterile process technology," ZETA Evolution of Technology, Zeta Holding GmbH, Lieboch/Graz; exact publication date unknown, but at least as early as Aug. 2, 2018; exact publication date unknown, but at least as early as Nov. 28, 2018. (12 pages).

Catalog, Tank Agitators Aerre Inox SRL, TM Series Article: 00131031, Magnetic Agitator/Vertical/Pharmaceutical Industry, Aug. 3, 2018, http://ritmindustry.com/uk/catalog/tank-agitators/magnetic-agitator-vertical-pharmaceutical-industry, RITM Industry; exact publication date unknown, but at least as early as Aug. 2, 2018. (1 page).

International Search Report (PCT/ISA/210) and Written Opinion (PCT/ISA/237) mailed on Feb. 12, 2020, by the European Patent Office as the International Searching Authority for International Application No. PCT/EP2019/082256. (10 pages).

ZETA Success Stories, "Largest Possible Agitator Bearing Gap, offense Design," Aug. 2, 2018, pp. 1-3, https://www.zeta.com/en/largest-possible-agitator-bearing-gap_43_d_184.htm, ZETA Holding GmH, Lieboch/Graz; exact publication date unknown, but at least as early as Aug. 2, 2018. (3 pages).

English translation of the Office Action (Notice of Preliminary Rejection) issued Jan. 1, 2023, by the Korean Intellectual Property Office in corresponding Korean Patent Application No. 10-2021-7019609. (8 pages).

* cited by examiner

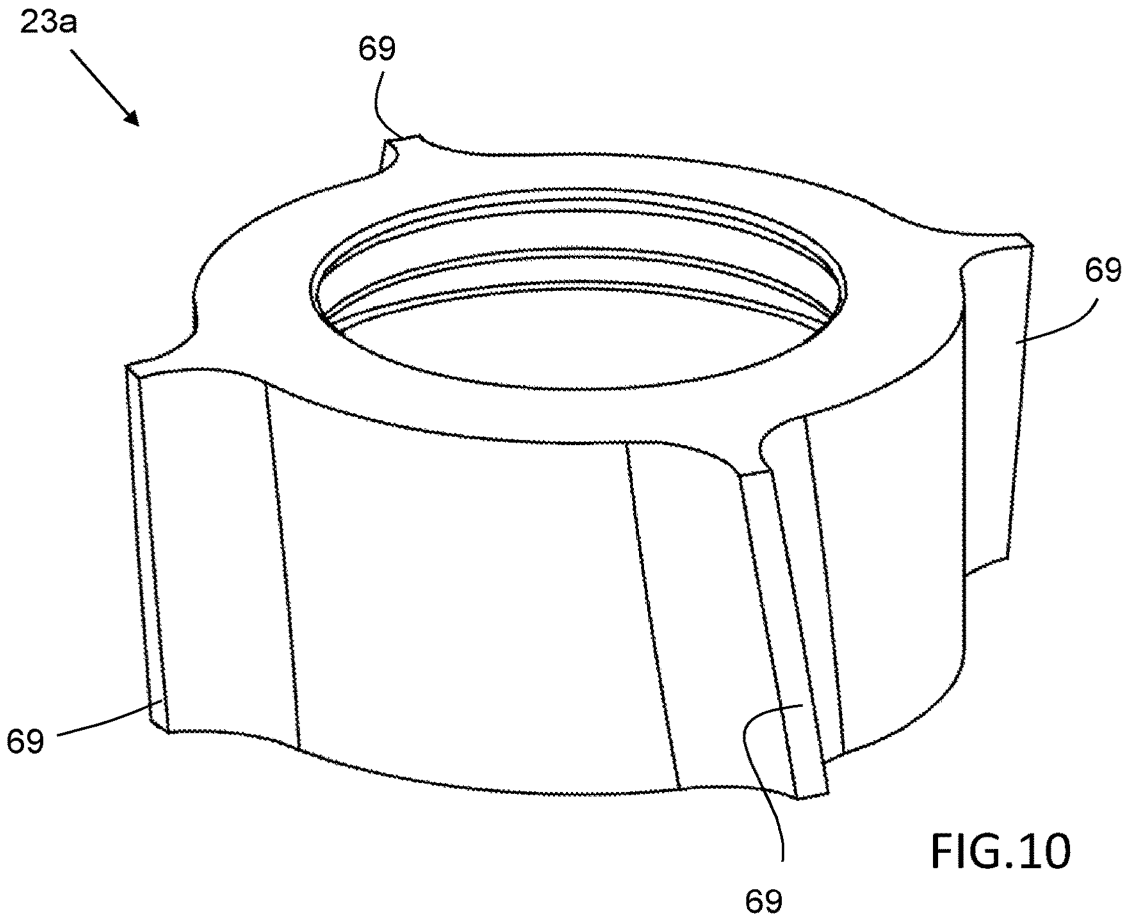
FIG.10
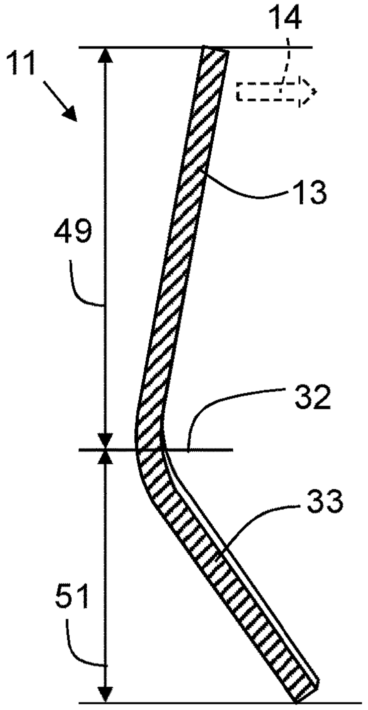
FIG.11 B-B
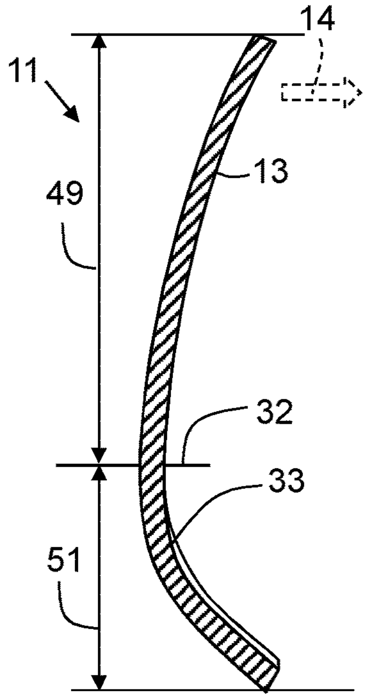
FIG.12 B-B
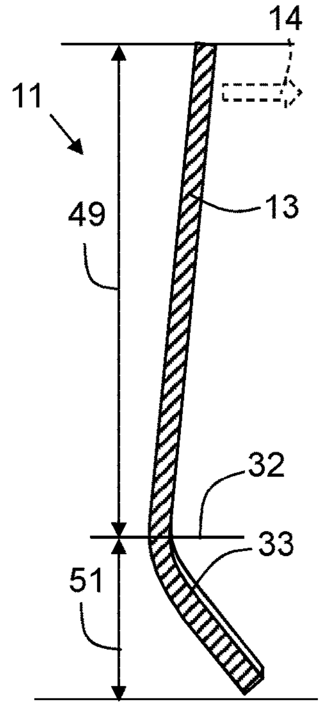
FIG.13 B-B

MAGNETICALLY-COUPLED LIQUID MIXER

TECHNICAL FIELD

The disclosure relates to magnetically-coupled liquid mixers. More particularly, it relates to mixers, which are magnetically coupled through the wall of a mixing tank so that no seal is required in the tank wall in order to transmit rotary torque to the mixer.

Although the liquid mixer will be described in relation to a general schematic tank, the disclosure is not restricted to this particular implementation, but may alternatively be installed in other types of liquid containers. Moreover, the disclosure relates generally to mixing technology such as is required for the mixing of food products, pharmaceuticals, and chemical products, or the like.

BACKGROUND ART

Many production processes require mixing of liquids in an ultraclean operation. Such production processes may include the mixing of products such as pharmaceuticals, foods and chemicals. Certain of these may require aseptic processing. The term ultraclean as used herein refers in general to particularly stringent requirements for the levels of contamination, which are acceptable in such processes.

Contamination in mixing processes may come from a number of sources. Among these are the mixing equipment itself and the cleaning processes, which are invariably required during the use of such equipment.

One source of contamination comes from seals, which may be required to seal a piece of equipment, which must penetrate into the mixing tank. Seals may be required, for example, around a rotary drive shaft to drive a mixer in the tank. For this and other reasons, elimination of such seals is highly desirable.

Another source of contamination is the relative movement of bearing surfaces against one another. This is particularly true when the bearing surfaces are not surrounded by liquid to provide lubrication to the bearing surfaces. When a mixing tank is nearly empty of the product being mixed (mixing typically takes place while the product is being transferred from the mixing tank into other containers), the bearing surfaces within the mixer run “dry.” During this period of operation, wear particles are more easily generated and then find their way into the product, either in the current batch of product or in a subsequent batch.

The cleaning of the mixing tank and other equipment is also a source of contamination if performed unsatisfactory. Remaining of a mixed liquid product can become trapped in areas that are hard to reach during the cleaning process. Thus, it is desirable to be able to reach every area within a piece of equipment with the cleaning fluid being used.

Conventional magnetically-coupled mixers, such as for example the agitator disclosed by prior art document US 2007/0036027 A1, solves many of the above-mentioned problems. However, despite the activities in the field, there is still a demand for a further improved magnetically-coupled mixers, in particular in terms of mixing efficiency.

SUMMARY OF THE DISCLOSURE

This section provides a general summary of the disclosure, and is not a comprehensive disclosure of its full scope or all of its features.

Magnetic mixers with an impeller having substantially radial blades have upon operation generally an axial flow towards the impeller, and a radial flow out from the impeller. The radial outflow is caused by the pumping effect of the impeller working as a radial compressor.

A big concern for conventional magnetically-coupled mixers is the risk that the impeller slides off an impeller shaft during operation of the impeller, because the axial flow towards the impeller tends to pull the impeller off a drive mount of the impeller, and the impeller is generally only coupled to the impeller shaft via the magnetic field interaction of a first and second magnet array.

The fluid dynamic forces acting on the blades can be large and rapidly changing due to such variables as high liquid viscosity, high mixing rates, and turbulence.

In other words, if the blades have a form that may cause a strong enough lifting effect on the impeller upon operation due to fluid dynamic forces acting to pull the impeller off the shaft, the magnetic force acting to hold the impeller in place may be insufficient and the impeller is pulled off.

Such an incident requires extensive work effort for repairing due to the location of the impeller within the tank, in combination with the stringent requirements for the levels of contamination.

Consequently, conventional magnetic mixers have always been provided with blades that, at least at an upper portion thereof, are angled or curved away from an intended direction of rotation for reducing the lifting effect caused by the fluid dynamic force acting on the impeller, such that the risk for losing the impeller is reduced.

However, the fluid pumping effect generated by having at least an upper portion of the blade being curved or angled away from an intended direction of rotation, is contradictory to the above-mentioned pumping effect of the impeller working as a radial compressor. The radial compressor pumping effect is generally stronger than the pumping effect caused by the rearwards angles impeller blades, so the magnetic mixer will operate as required, but the overall pumping efficiency is low due to the contradictory pumping effects and the turbulence caused thereof.

An object of the present disclosure is consequently to provide a magnetically-coupled mixer that provides improved mixing efficiency.

This and other objects are at least partly achieved by a magnetically-coupled liquid mixer as defined in the accompanying independent claim.

In particular, the objective is at least partly achieved by a magnetically-coupled liquid mixer having an axial direction and a radial direction and comprising a drive mount configured to be secured to a wall of a mixing tank and having a stationary closed-end cylindrical casing arranged in the axial direction and configured for protruding into the tank, a tank-external drive rotor having a rotatable first magnet array and configured to be inserted in the cylindrical casing, and an impeller configured for being rotatably-mounted on the cylindrical casing and having a plurality of radially extending blades and a second magnet array, wherein the first and second magnet arrays in an assembled state of the mixer are configured for enabling rotary torque to be transferred from the drive rotor to the impeller by magnetic coupling between the first and second magnet arrays, and wherein an upper portion of at least one of the blades, preferably of at least two of the blades, more preferred of each blade, is curved or angled in an intended direction of rotation, thereby contributing to moving liquid axially downwards during impeller rotation. Preferably, an upper portion of at least half of the blades, such as of at least a majority of the blades, such as of all blades, is curved or angled in an intended direction of rotation.

By having the upper portion of at least one of the blades, such as of each blade, curved or angled in an intended direction of rotation, the blades do no longer produce an opposing pumping effect to the radial compressor pumping effect. On the contrary, the pumping effect of the blades even contributes to moving liquid axially downwards during impeller rotation. Thereby, less turbulence is generated and an increase in mixing efficiency is accomplished.

Moreover, extensive Computational Fluid Dynamics (CFD) simulations have shown that the radial compressor pumping effect generates a reduced fluid pressure not only on the upper side of the impeller, but also on the lower side of the impeller, thereby indicating that the risk for impeller slip-off is not that large as previously believed, and there is no significant increased risk for impeller slip-off by having the upper portion of the blades being curved or angled in an intended direction of rotation.

Prior art document US 2007/0036027 A1 may at first glance appear similar to the magnetic mixer of the present disclosure, but the agitator head showed in FIG. 1*a* of said prior art document is in fact intended to rotate clockwise, when seen from above, i.e. in a direction downwards towards an interior surface of a wall of a tank in a mounted state of the impeller. As a result, the upper portion of the blades in US 2007/0036027 A1 are in fact angled backwards in the intended direction of rotation. The upper portion of the blades in said prior art document are consequently not curved or angled in the intended direction of rotation.

Further advantages are achieved by implementing one or several of the features of the dependent claims.

In one example embodiment, said at least one of the blades comprises the upper portion and a lower portion. In other words, at least one of the blades comprises an upper portion and a lower portion and the upper portion of said at least one of the blades is curved or angled in an intended direction of rotation, thereby contributing to moving liquid axially downwards during impeller rotation.

Preferably, each of the blades comprise the upper portion and a lower portion. This may imply that, each of the blades comprises an upper portion and a lower portion and the upper portion of at least one of the blades is curved or angled in an intended direction of rotation, thereby contributing to moving liquid axially downwards during impeller rotation. Preferably, each of the blades comprises an upper portion and a lower portion and the upper portion of each of the blades is curved or angled in an intended direction of rotation, thereby contributing to moving liquid axially downwards during impeller rotation. Preferably, said at least one of the blades, such as each blade, is divided into the upper portion and the lower portion as seen in the axial direction.

In one example embodiment, the lower portion is located closer to the drive rotor than the upper portion as seen in the axial direction. Correspondingly, the upper portion is located further away from the drive rotor than the lower portion as seen in the axial direction.

In one example embodiment, an upper end of the upper portion of said at least one of the blades, such as of each blade, is located further forwards in the intended direction of rotation than a lower end of the upper portion. This defines the desired shape of the upper portion of the blades, namely having an upper portion of the blade, such as of each blade, curved or angled in an intended direction of rotation.

In a further example embodiment, also a lower portion of each blade is also curved or angled in the intended direction of rotation, thereby contributing to changing the flow direction of the liquid from axially downwards to radially outwards when passing through the impeller.

Moreover, having the lower portion of the blade, such as of each blade, curved or angled in the intended direction of rotation further reduces the fluid pressure in the area below the impeller, i.e. between the impeller and the wall of the tank, because the lower portion of the blades will generate an axially upwards pumping effect, i.e. a pumping effect opposite to the pumping effect of the upper portion of the blades. Consequently, the risk for impeller slip-off is further reduced.

In still a further example embodiment, a surface area ratio between the upper and lower portions of a blade, more precisely of said at least one of the blades, such as of each blade, is in the range of 1-5, specifically 2-4, and more specifically 2.5-3.5. The radial compressor effect of the impeller and the forwards angled or curved upper portion surface jointly contribute to improved axial downwards flow to the impeller, and the opposite pumping effect of the lower portion may not be too large, because this would decrease the axial downwards pumping effect. Hence, the lower portion should only be so large as to contribute to the redirection of the flow from axial to radial flow. The above-mentioned surface area ratio ranges correspond generally to such a combination of pumping effects.

In yet a further example embodiment, at least 70%, specifically at least 80%, and more specifically at least 90%, of a surface area of the upper portion of said at least one of the blades, such as of each blade, is curved or angled in the intended direction of rotation with an angle in the range of 3-30 degrees, specifically 5-20 degrees, and more specifically 7-15 degrees, with respect to an axial plane that is parallel with the axial direction and extends through a rotational axis of the impeller. It is desirable to use as much surface area of the upper portion of the blades as possible for contributing to the downwards pumping effect, because this results in increased mixing efficiency.

In a further example embodiment, at least 70%, specifically at least 80%, and more specifically at least 90%, of a surface area of the lower portion of said at least one of the blades, such as of each blade, is curved or angled in the intended direction of rotation with an angle in the range of 10-60 degrees, specifically 20-50 degrees, and more specifically 30-40 degrees, with respect to an axial plane that is parallel with the axial direction and extends through a rotational axis of the impeller.

In a further example embodiment, the blades are made of sheet metal and welded to an impeller hub. This provides a strong and easily cleaned impeller and the blades may be cost-efficiently manufactured by means of a straightforward metal stamping operation.

In a further example embodiment, the lower portion of the blades are free from attachment to the impeller hub. Thereby welding of the blades to the impeller hub in the direct vicinity of the magnet array of the impeller is avoided, such that heat damages to the magnet array due to welding can be avoided, or that time-consuming temperature reducing interruption in the welding process can be avoided. Moreover, the lack of attachment of the lower portion also simplifies cleaning of the impeller.

In a further example embodiment, said at least one of the blades, such as each blade, is bent along a bend axis that defines a border line between the upper and lower portions of the blade. Thereby the forward angled upper portion, and possibly also forward angled lower portion, is easily and cost-efficiently obtainable.

In a further example embodiment, said at least one of the blades, such as each blade, is bent along a straight bend axis defining an angle in the range of +/−40 degrees, specifically in the range of +/−25 degrees, and more specifically in the range of +/−10 degrees with respect to the radial direction R.

Thereby the rotational outline of the lower edge of the blade can be adapted to better conform to the interior surface of the tank. For example, by having the bend axis being inclined upwards when viewed in a direction facing away from the rotational axis of the impeller, the rotational outline of the lower edge of the blade is adapted to better conform to a conical or cylindrical interior bottom or side wall surface of a tank. Moreover, the variation in bend axis angle also enables adaptation of the operating characteristics of the impeller, in particular the redirecting performance of the lower part of the impeller.

In a further example embodiment, said at least one of the blades, such as each blade, has a single bend. Thereby the desired improved mixing efficiency can be obtained by means of a single relatively cost-efficient and straightforward bending operation of the blades.

In a further example embodiment, at least a part of the upper portion of said at least one of the blades, such as of each blade, extends in the radial direction. Thereby a high pumping efficiency is obtained.

In a further example embodiment, upper edges of the blades extend substantially in a radial plane of the impeller, and radially outer edges of rotational outlines of the blades are substantially parallel with the axial direction. This geometry enables improved mixing efficiency and flow through the impeller, because the upper edge to extend substantially perpendicular to an incoming axial flow to the impeller and the radially outer edge to extend substantially perpendicular to an outgoing radial flow from the impeller.

In a further example embodiment, said at least one of the blades, such as each blade, has a front side and back side with respect to an intended rotary motion of the impeller, wherein at least 70%, specifically at least 80%, and more specifically at least 90%, of a surface area of an upper portion of the front side has a vector component of a normal vector directed downwards in the axial direction. By using a large surface area of the upper portion for improving the axial downwards flow through the impeller, interference flow caused for example by a small rearwards inclined part of the upper portion of the blades is reduced.

In a further example embodiment, an average radial extension of the blade, more precisely of said at least one of the blades, such as of each blade, is larger than 20%, specifically larger than 25%, and more specifically larger than 30%, of a maximal outer diameter of the drive rotor. This geometry typically corresponds to a low shear mixer with primarily an agitator functionality.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which:

FIG. 10 shows a perspective view of the upper part of the impeller of FIG. 9; and FIGS. 11-13 show three alternative example embodiments of a blade according to the disclosure.

DETAILED DESCRIPTION OF EXAMPLE EMBODIMENTS OF THE DISCLOSURE

Figure 1:
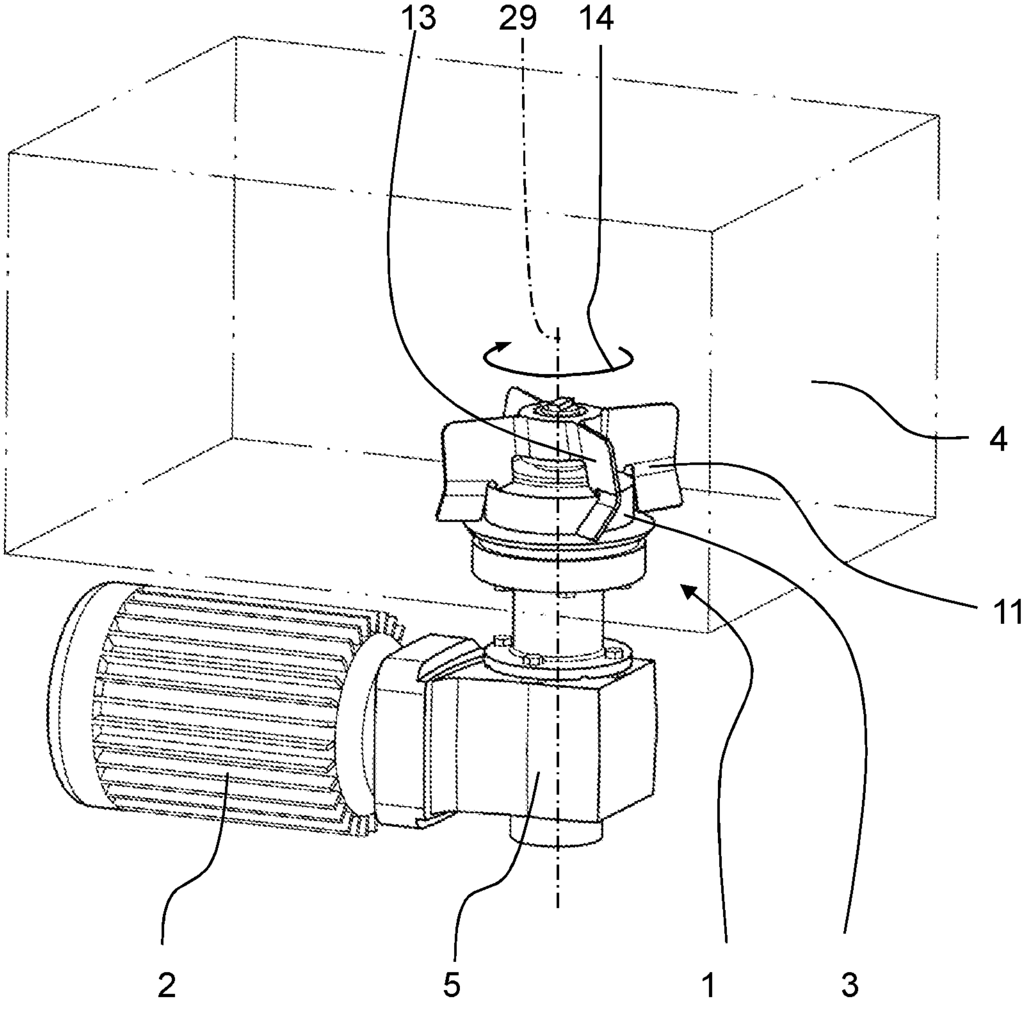
FIG. 1 shows a schematic perspective view of an example embodiment of the magnetic mixer according to the disclosure implemented with a rotary power source and mounted in a tank.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Referring now to FIG. 1, there is depicted a perspective view of an example embodiment of a magnetically-coupled liquid mixer 1 according to the disclosure, also simply referred to herein as magnetic mixer, drivingly connected to a rotary power source 2 and including an impeller 3 located within a schematically illustrated mixing tank 4.

The impeller is configured for operating as a low-shear impeller designed to provide agitation and mixing of a liquid content of the tank, for example in the pharmaceutical or food industry.

When operating the rotary power source 2 the impeller 3 is configured to rotate in an intended direction of rotation 14 around a rotational axis 29 of the impeller 3 for mixing a liquid within the tank 4. In FIG. 1, the intended direction of rotation 14 corresponds to a clockwise direction of rotation, when seen from above, i.e. in a direction downwards.

The rotary power source 2 can vary significantly. For example, the rotary power source 2 may be an electric motor, a pneumatic motor, a hydraulic motor, or any other appropriate source of rotary power. The rotary power source 2 may be drivingly connected to the impeller 3 via a transmission 5 for obtaining a suitable impeller rotational speed.

Figure 2:
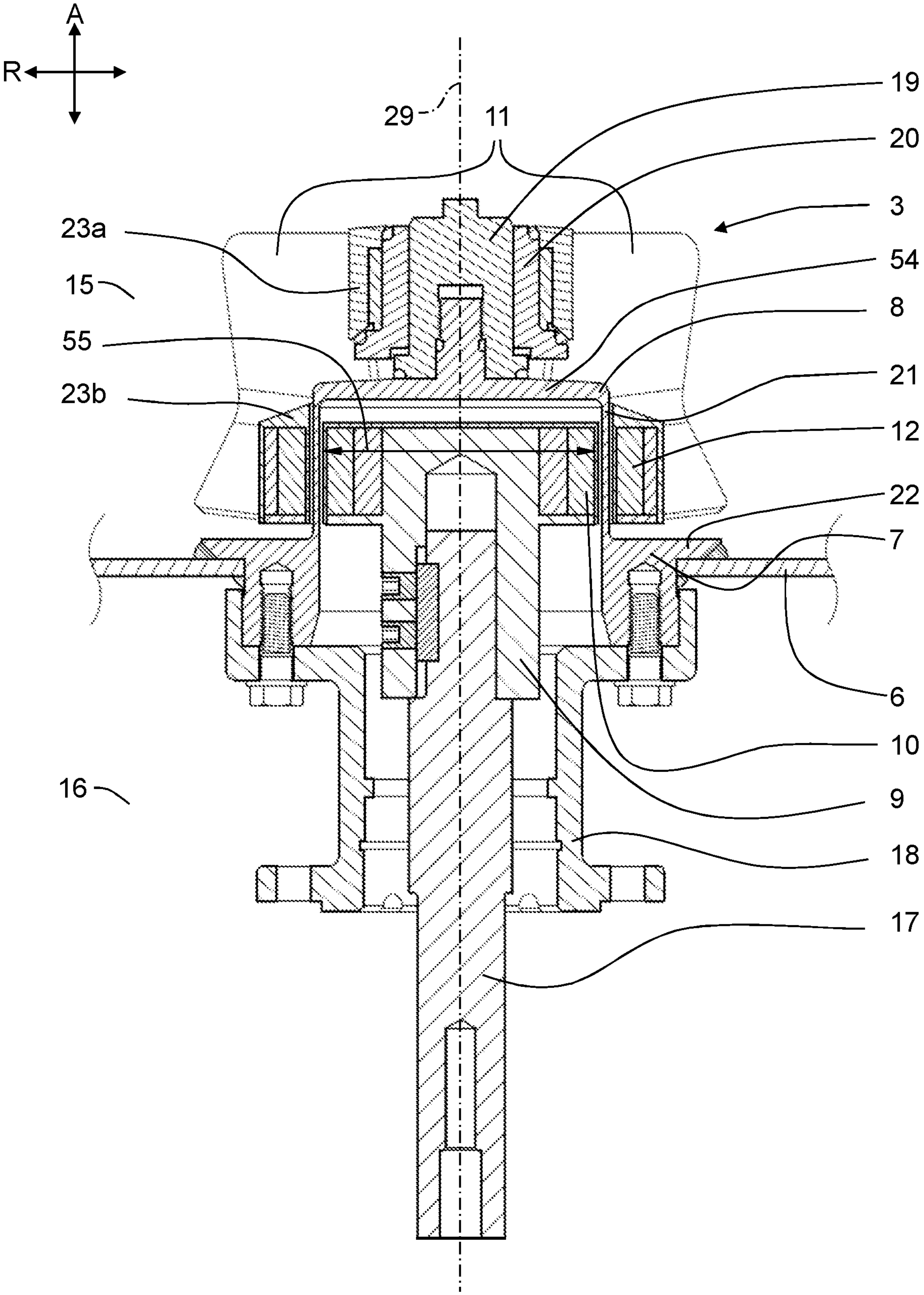
FIG. 2 shows a cross-section of an example embodiment of the magnetic mixer according to the disclosure.

The structural composition of the magnetic mixer 1 according to one example embodiment is described more in detail with reference also to FIG. 2, which shows a cross-section of the magnetic mixer 1 in an assembled state within a wall 6 of a mixing tank 4.

In FIG. 2, a tank-internal side 15 and a tank-external side 16 is shown. Thus, the magnetic mixer 1 has a tank-internal side 15 and a tank-external side 16. The tank-internal and tank-external sides 15, 16 are divided by the wall 6 of the tank 4. The tank-internal side 15 is located inside the tank 4. The tank-external side 16 is located outside the tank 4.

The magnetically-coupled liquid mixer 1 has an axial direction A and a radial direction R and comprises a drive mount 7 configured to be secured to the wall 6 of the mixing tank 4 and having a stationary closed-end cylindrical casing 8 arranged in the axial direction and configured for protruding into the tank 4.

The magnetic mixer 1 further comprises a tank-external drive rotor 9 having a rotatable first magnet array 10 and configured to be inserted in the cylindrical casing 8 of the drive mount 7. The drive rotor 9 further has a maximal outer diameter 55.

In addition, the magnetic mixer 1 further comprises the impeller 3 configured for being rotatably-mounted on the cylindrical casing 8 and having a plurality of radially extending blades 11 and a second magnet array 12, wherein the first and second magnet arrays 10, 12 in the assembled state of the magnetic mixer 1, shown in FIG. 2, are configured for enabling rotary torque to be transferred from the drive rotor 9 to the impeller 3 by magnetic coupling between the first and second magnet arrays 10, 12.

The impeller 3 comprises an impeller hub, which carries the blades 11. Specifically, the hub is composed of an upper hub part 23*a* and a lower hub part 23*b*.

The impeller 3 is arranged on the tank-internal side 15 of the drive mount 7, i.e. inside the tank 4. The drive rotor 9 is arranged on the tank-external side 16 of the drive mount 7, i.e. outside the tank 4. The tank-internal side 15 and the tank-external side 16 are opposite sides of the drive mount 7.

The blades 11 comprise an upper portion 13 and a lower portion 33.

Moreover, as better shown in FIG. 1, an upper portion 13 of at least one blade 11, such as of each blade 11, is curved or angled in the intended direction of rotation 14, thereby contributing to moving liquid axially downwards during impeller rotation in the intended direction of rotation 14.

The upper portion 13 is located further on the tank-internal side 15 than the lower portion 33 as seen in the axial direction A. The lower portion 33 is located further towards the tank-external side 16 than the upper portion 13 as seen in the axial direction A. In general, upper refers to a location facing or being further on or further towards the tank-internal side 15 as seen in the axial direction A, while lower refers to a location facing or being further on or further towards the tank-external side 16 as seen in the axial direction A. Similarly, in general, above refers to a location being further on or further towards the tank-internal side 15 as seen in the axial direction A, while below refers to a location being further on or further towards the tank-external side 16 as seen in the axial direction A.

With reference again to FIG. 2, the drive mount 7 may for example be positioned within a hole in the wall 6 of the tank 4 and subsequently secured to said wall 6 for example by welding around the circumference of the drive mount 7. Welding provides a robust and leak-proof installation of the drive mount 7 in the wall of the tank 4.

The closed-end cylindrical casing 8 may for example be integrally formed with, or welded to, an attachment flange 22 of the drive mount 7, which attachment flange 22 is configured for attaching the drive mount 7 to the wall 6 of the tank 4, for example by welding or by threaded members.

The closed-end cylindrical casing 8 comprises a relatively thin cylindrical wall 21 with an end closure 54. Consequently, one axial side of the cylindrical casing 8 is closed and the opposite axial side is open for enabling the rotor drive 9 to be inserted into the cylindrical casing. When being attached to a lower end region of a tank 4, the cylindrical casing 8 is oriented with the opening facing downwards towards the drive rotor 9, which generally is located below the drive mount 7, and the closed end is protruding into the tank but closed and thereby ensuring a completely sealed tank without any risk for leakage or contamination.

The magnetic mixer 1 transmits the required rotary torque from the drive rotor 9 to the impeller 3 by means of magnetic coupling between the drive rotor 9 and the impeller 3. The magnetic coupling may for example be provided by having the first and second magnet arrays 10, 12 comprising permanent magnets, wherein a relatively thin radial wall 21 of the cylindrical casing 8 separates the first and second magnet arrays 10, 12 in the radial direction R. Consequently, when rotary torque from the rotary power source 2 is transmitted to the drive rotor 9, this rotary torque is transferred to the impeller by means of magnetic field interaction between the first and second magnet arrays 10, 12, which results in rotational locking of the impeller 3 to the drive rotor 9.

Since the magnetic field couples across an air gap and through the relatively thin radial wall 21 of the cylindrical casing 8 of the drive mount 7, there is no hole in the tank for passage of a drive shaft to the impeller. Hence, the tank is not compromised and therefore does not require a seal. This eliminates the risk of leakage and strongly reduces the risk for product contamination.

Moreover, the first and second magnet arrays 10, 12 are arranged to provide a magnetic coupling that ensures levitation of the impeller 3 at all times. Magnetic impeller levitation enables complete drainability of process fluids and the free flow of clean-in-place (CIP) liquid and steam around all parts of the mixer, thereby ensuring thorough cleaning. Impeller levitation also eliminates axial wear.

Referring again to FIG. 2, the rotary power source (not shown) drives mixer 1 through a drive shaft 17 which is fixed to the drive rotor 9, and a mounting sleeve 18 is provided for connecting the magnetic mixer 1 to the transmission 5.

A stub shaft 19 is mounted on a top side of the cylindrical casing 8 and carries a stub shaft bearing 20 affixed to stub shaft 19 for controlling to position of the impeller 3.

Figure 3:
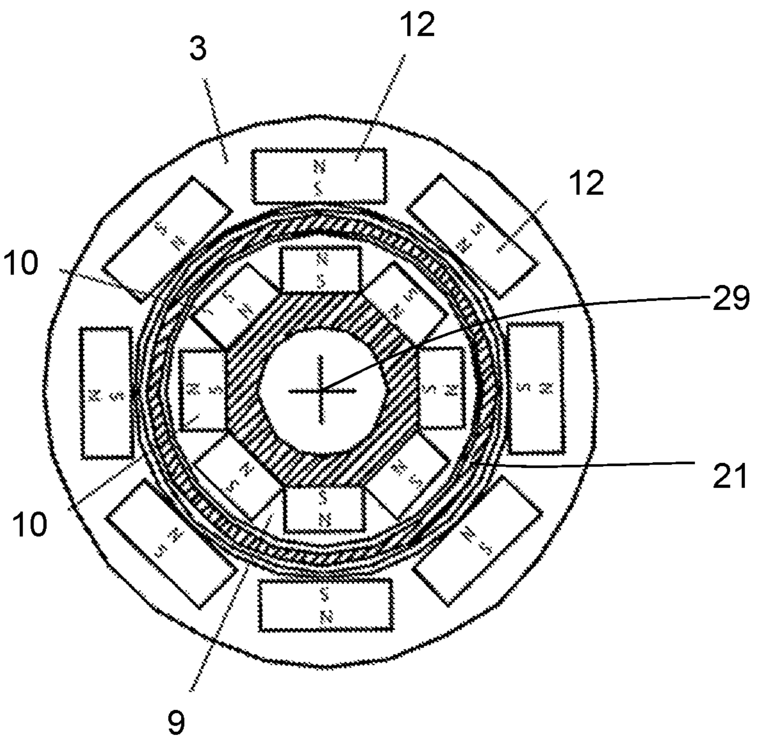
FIG. 3 shows a cross-section of the magnetic mixer in a radial plane.

An example embodiment of a top view of a cross-section of the magnetic mixer 1 is schematically showed in FIG. 3. The cross-section depicts a radial plane including the first and second magnet arrays 10, 12, wherein the arrangement of these magnet arrays 10, 12 is clearly shown on FIG. 3. The blades 11 are not shown.

Each of the first and second magnet arrays 10, 12 of the example embodiment of FIG. 3 contains an even number of permanent magnets, in this example eight magnets. Within each array 10, 12, the same number of individual magnets are arranged evenly spaced circumferentially in circular fashion with their magnetic fields alternatingly aligned N-to-S and S-to-N in the radial direction as illustrated in FIG. 3. The interaction between the magnetic field of the magnets of the first and second magnet arrays 10, 12 will cause the impeller 3 to position itself as shown in FIG. 3, namely with the north pole N of each second impeller magnet facing the south pole S of the corresponding drive rotor magnet, and with the south pole S of each remaining impeller magnets facing the north pole N of the corresponding drive rotor magnet. This configuration will create a strong rotational coupling between the drive rotor 9 and impeller 3, such that the drive rotor can control the rotational motion of the impeller merely by magnet field through the radial wall 21 of the cylindrical casing 8. The individual magnets in first and second magnet arrays 10, 12 are preferably rare earth magnets.

Figure 4:
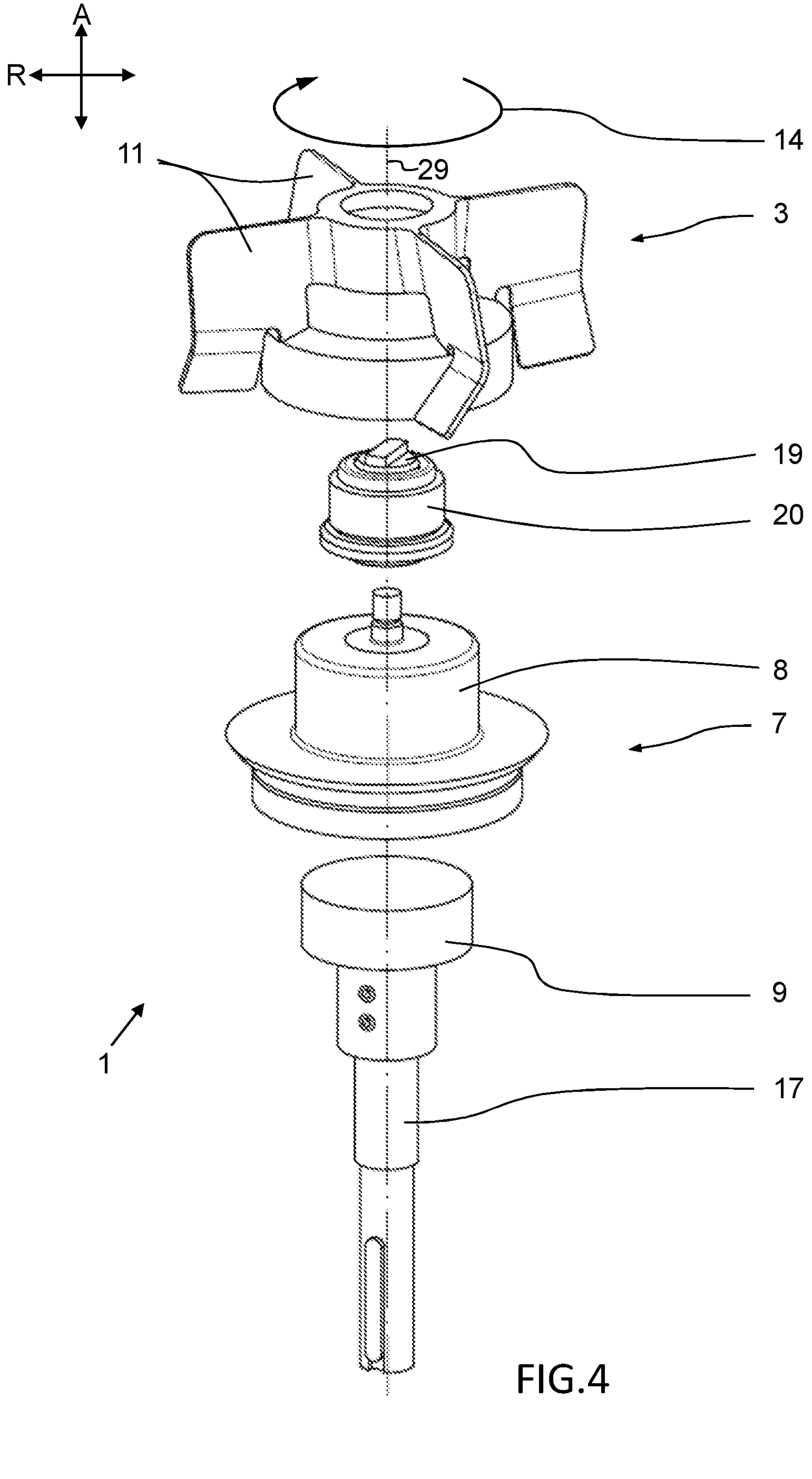
FIG. 4 shows a schematic exploded view of an example embodiment of the magnetic mixer according to the disclosure.

An exploded view of the parts of the magnetic mixer according to an example embodiment is shown in FIG. 4, namely the impeller 3 with its blades 11, the stub shaft 19 and stub shaft bearing 20 affixed thereto, the drive mount 7 with the closed-end cylindrical casing 8, and the drive rotor 9 connected with the drive shaft 17, in this order from the top side to the bottom side of the impeller 3.

The design and form of the impeller 3, and in particular the blades 11 of the impeller 3, will hereinafter be described more in detail with reference to FIG. 5, which shows a side view of an example embodiment of the impeller 3.

Figure 5:
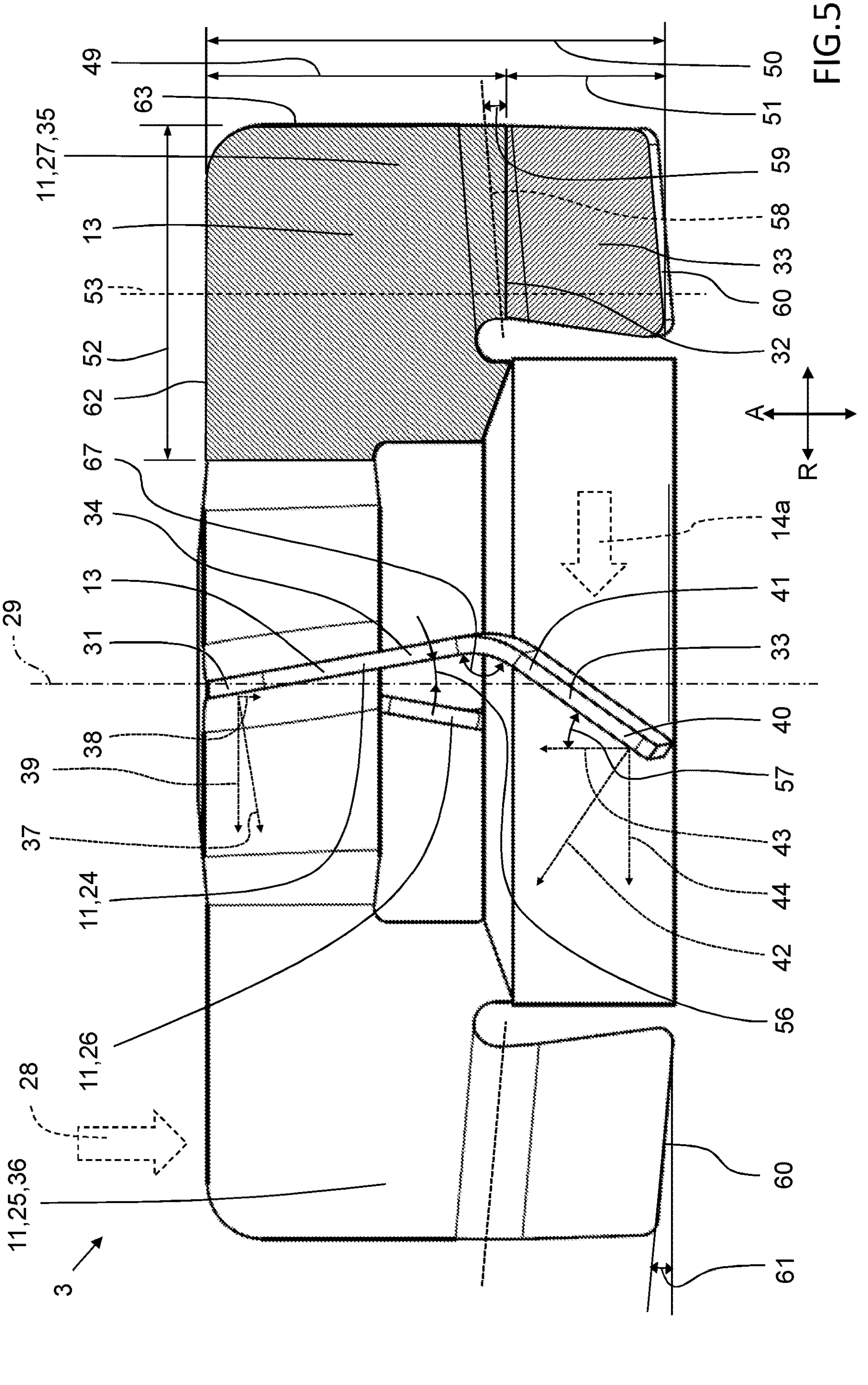
FIG. 5 shows a side view of an example embodiment of an impeller according to the disclosure.

The impeller 3 according to the specific example embodiment of FIG. 5 has four blades 11, a first blade 24 oriented towards the viewer, a second blade 25 located on the left side of the impeller 3, a third blade 26 partly hidden by the impeller 3, and a fourth blade 27 specific located on the right side of the impeller.

At least one of the blades, such as each blade, is divided by a border line 32 into an upper portion 13 and a lower portion 33, as seen in the axial direction A. The upper portion 13 thus immediately borders with the lower portion 33.

The lower portion 33 is configured to be located closer to the wall 6 of the tank 4 than the upper portion 13. In other words, the lower portion 33 is configured to be located closer to the drive rotor 9 and the upper portion 13 is configured to be further away from the drive rotor 9, as seen in the axial direction A. When considering the impeller, upper may refer to a location facing away from or being further away from the drive rotor or the wall of the tank to which the drive mount is configured to be secured as seen in the axial direction, while lower may refer to a location facing or being closer to the drive rotor or the wall of the tank to which the drive mount is configured to be secured as seen in the axial direction. Similarly, when considering the impeller, above may refer to a location being further away from the drive rotor or the wall of the tank to which the drive mount is configured to be secured as seen in the axial direction, while below may refer to a location being closer to the drive rotor or the wall of the tank to which the drive mount is configured to be secured as seen in the axial direction.

The lower portion 33 of the blade 11 is a lowermost portion of the blade 11. The upper portion 13 of the blade 11 is an uppermost portion of the blade 11.

The border line 32 may extend in the radial direction R, as illustrated in the example embodiment of FIG. 5.

The border line 32 may typically extend in an intermediate region of the blade located substantially between an upper portion curved or angled in the intended direction of rotation and the lower portion, which also may be curved or angled in the intended direction of rotation.

Moreover, if the blade has a bend that divides the blade between an upper portion curved or angled in the intended direction of rotation and the lower portion, which also may be curved or angled in the intended direction of rotation, the border line may be defined by a bend axis of said bend.

In FIG. 5, a front side surface area of the fourth blade 27 is hatched for describing the boundary of the blade 11, as seen from a front of the blade 11. In particular, the upper portion 13 is marked with a right-hatched area and the lower portion 33 is marked with a left-hatched area, wherein a radially extending border line 32 defines the border between the upper and lower portions 13, 33.

An axial length 49 of the upper portion 13 of the blade 11 may for example be in the range of 40-90%, specifically 50-80%, of a total axial length 50 of the blade 11.

An axial length 51 of the lower portion 33 of the blade 11 may for example be in the range of 10-60%, specifically 30-50%, of a total axial length 50 of the blade 11.

Moreover, a ratio between the axial length 49 of the upper portion 13 and the axial length 51 of the lower portion 33 may be in the range of 0.7-9.0, specifically in the range of 1.0-3.0.

In the illustrated schematic embodiment of FIG. 5, said ratio between the axial length 49 of the upper portion 13 and the axial length 51 of the lower portion 33 is about 2.0.

If the border line 32 is not parallel with the radial direction R the axial length 49-51 and ratio between said axial lengths defined above is measured where the border line 32 intersects with an axially extending radial centre line 53 of the blade based on the maximal radial extension 52 of the blade 11.

Moreover, each blade 11 has a front side 35 and back side 36 with respect to an intended rotary motion of the impeller 3. The front side 35 faces forwards in the intended rotary motion of the impeller 3, and the back side 36 faces rearwards in the intended rotary motion of the impeller 3.

The impeller 3 is configured to rotate in a clockwise direction of rotation, such that the first blade 24 will move in the direction of rotation as illustrated by arrow 14*a* in FIG. 5. Consequently, since the upper portion 13 of the first blade 24 is angled in the intended direction of rotation 14, the first blade contributes to moving liquid within the tank axially downwards, i.e. along a direction as illustrated by arrow 28 in FIG. 5, during impeller rotation in the intended direction of rotation 14.

The term downwards herein refers to the direction from the upper portion 13 to the lower portion 33 of the blades 11, in the axial direction A, i.e. towards an interior surface of the wall 6 of the tank 4 when the impeller 3 is in a mounted and ready to use state.

In other words, by having the upper portion 13 of at least one blade 11, such as of each blade 11, pitched in the direction of the rotation 14 the fluid is pushed primarily in the axial direction A in the upper portion 13 of the impeller, thereby allowing a fluid flow to enter the impeller 3 primarily in an axial direction A upon operation of the impeller in the intended direction of rotation 14.

Having the upper portion 13 of at least one blade 11, such as of each blade 11, angled in the direction of the rotation 14 means that the upper portion 13 is angled in a rotational forwards direction 14 compared with a portion of the blade located further below in the axial direction A, such as at an border line 32 between the upper and lower portions 13, 33 of the blade 11.

Consequently, having the upper portion 13 of at least one blade 11, such as of each blade 11, curved or angled in the intended direction of rotation 14 essentially means that an upper end 31 of the upper portion 13 of the at least one blade 11, such as of each blade 11, is located further forwards in the intended direction of rotation 14 than a lower end 34 of the upper portion 13.

As a result, a surface area of an upper portion 13 of the front side has a normal vector 37 composed of a first vector component 38 directed downwards in the axial direction A and a second vector component 39, perpendicular to the first vector component 38 and directed forwards in the intended direction of rotation 14.

In particular, at least 70%, specifically at least 80%, and more specifically at least 90%, of a surface area of an upper portion 13 of the front side may have a vector component 38 of a normal vector 37 directed downwards in the axial direction A.

The magnetic mixer 1 is configured for providing a good mixing performance of the liquid within the tank 4. The blades 11 of the mixer are therefore configured to produce a simultaneous axial and radial flow, because this combination often provides a better overall mixing. One approach for contributing to a simultaneous axial and radial flow is to also have a lower portion of at least one blade, such as each blade, curved or angled in the intended direction of rotation, because this contributes to changing the flow direction of the liquid within the tank 4 from axially downwards to radially outwards when passing through the impeller 3.

In particular, by having the lower portion of at least one blade, such as each blade, curved or angled in the intended direction of rotation 14 the lower portion not only is the downwards pumping effect of the upper portion stopped, the lower portion even provides a certain upwards pumping effect of liquid being located below the impeller, i.e. in the relatively small space between a lower side of the impeller 3 and the bottom or side wall 6 of the tank 4. Consequently, the axial downward flow of liquid will escape radially outwards from the impeller 3, thereby creating a radial flow in the lower end region of the impeller 3.

In other words, by having the lower portion 33 of at least one blade 11, such as of each blade 11, being pitched in the direction of the rotation 14 the primarily axial fluid flow produced by the upper portion of the blades 11 is redirected towards flowing primarily in the radial direction R in the lower portion 33 of the impeller, thereby enabling a nearly radial fluid flow to exit the impeller 3 upon operation of the impeller in the intended direction of rotation 14.

Having the lower portion 33 of at least one blade 11, such as each blade 11, angled in the direction of the rotation 14 means that the lower portion 13 is angled in the rotational forwards direction 14 compared with a portion of the blade 11 located above the lower portion 33 in the axial direction A, such as at the border line 32 between the upper and lower portions 13, 33 of the blade 11.

Consequently, having the lower portion 33 of at least one blade 11, such as each blade 11, curved or angled in the intended direction of rotation 14 essentially means that a lower end 40 of the lower portion 33 of the at least one blade 11, such as each blade 11, is located further forwards in the intended direction of rotation 14 than an upper end 41 of the lower portion 33.

As a result, a surface area of the lower portion 33 of the front side of each blade 11 has a normal vector 42 composed of a first vector component 43 directed upwards in the axial direction A and a second vector component 44, perpendicular to the first vector component 43 and directed forwards in the intended direction of rotation 14.

By having the lower portion 33 of at least one blade 11, such as each blade 11, curved or angled in the intended direction of rotation 14 the lower portion 33 of the blades 11 not only contributes to redirecting the downwards pumping effect of the upper portion 13 of the blades 11, the lower portion 33 of the blades 11 even provides a certain upwards pumping effect of liquid being located below the impeller 3, i.e. in the relatively small space between a bottom or side of the impeller 3 and the bottom wall 6 of the tank 4.

Moreover, the upwards pumping effect of the forwards inclined lower portion 33 of the blades 11 also creates a reduced liquid pressure in the area below the impeller 3 that contributes to maintaining the magnetic coupling between the impeller 3 and drive rotor.

Figure 6:
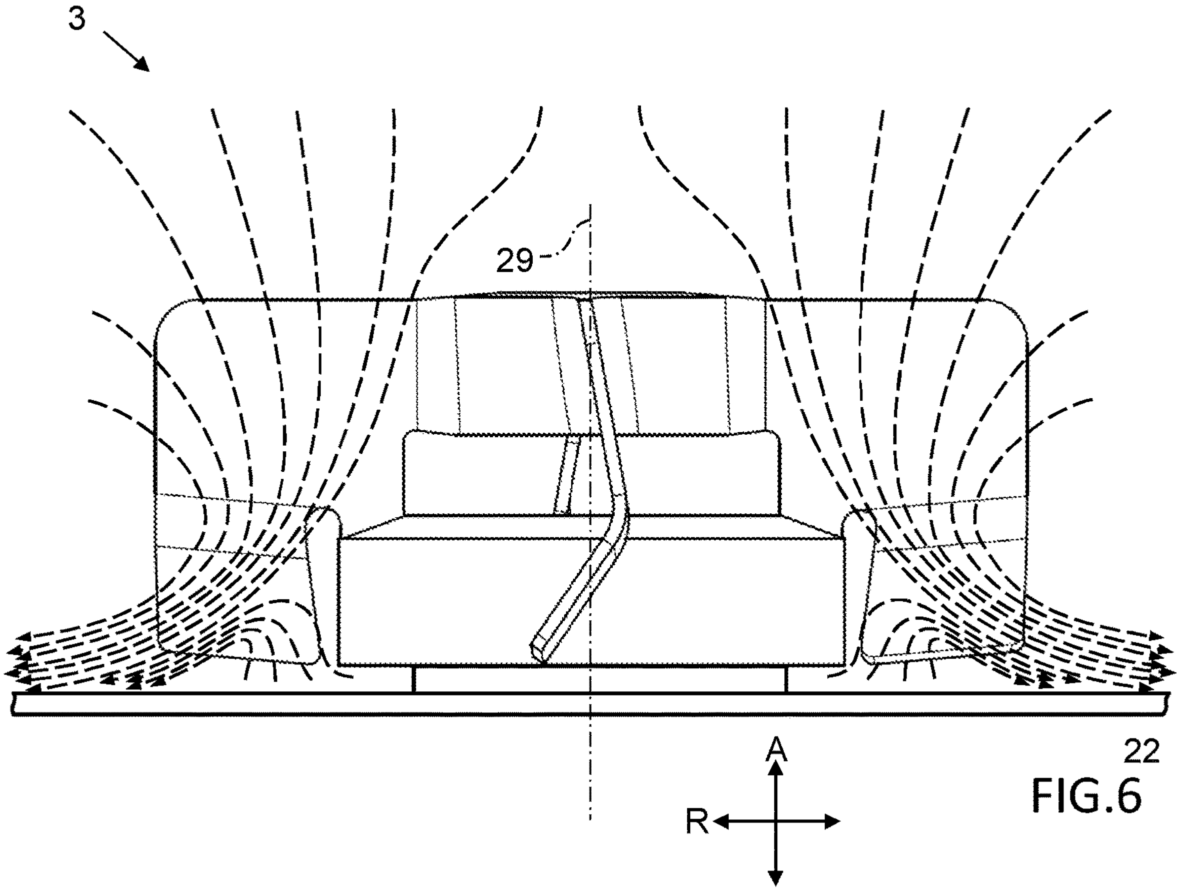
FIGS. 6 and 7 shows the flow of liquid through and around the impeller when operating the impeller.

A resulting liquid flow around and through the impeller 3 when operating the impeller 3 in the intended direction of rotation 14 based on Computational Fluid Dynamics (CFD) software simulation of the specific impeller design according to the example embodiment illustrated in FIG. 5 is schematically illustrated in FIG. 6.

The schematic flow profile shown in FIG. 6 essentially confirms a mainly axial flow at the upper entry of the impeller 3 at least partly caused by having the upper portion 13 of the blade 11, such as each blade 11, angled in the direction of the rotation 14, which axial flow is subsequently redirected in the lower region by assistance of the lower portion of the blade, such as each blade, being curved or angled in the intended direction of rotation 14 to become a mainly radial flow.

Figure 7:
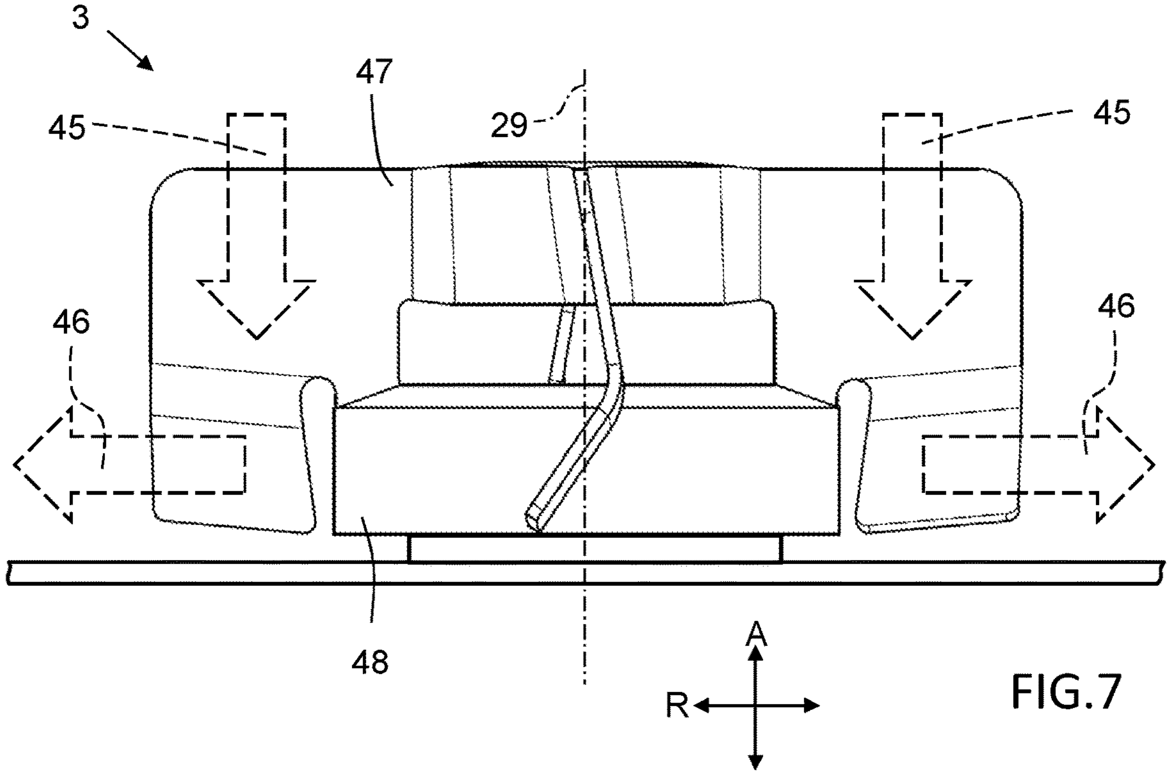

A schematic illustration of the resulting general flow directions generated by the impeller when being driven in the intended direction rotation 14 is shown in FIG. 7, wherein an entry axial flow 45 at the top side 47 of the impeller 3 is redirected into an exit radial outwards flow 46 at the bottom side 48 of the impeller 3.

The schematic flow profile shown in FIG. 6 also confirms that the forwards curved and angled lower portion of the blade 11, such as each blade 11, also provides a certain upwards pumping effect of liquid being located below the impeller, thereby reducing the pressure in the liquid in the region below the impeller 3 and thus also reducing the lifting force acting to lift the impeller of the drive mount 7.

With reference to FIG. 5 again, a surface area ratio between the upper and lower portions 13, 33 of a blade 11 may be in the range of 1-5, specifically 2-4, and more specifically 2.5-3.5. In the illustrated schematic embodiment of FIG. 5, said surface area ratio is about 3.0.

In the example embodiment of FIGS. 1, 4-9, 11 and 13 at least one blade, such as each blade, is bent along a straight bend axis 58 defining an angle 59 in the range of +1-40 degrees, specifically in the range of +1-25 degrees, and more specifically in the range of +1-10 degrees with respect to the radial direction R.

Specifically, the blades 11 of the impeller 3 according to the example embodiment of FIG. 5 are bent along a single straight bend axis 58 defining an angle, e.g. of about 10 degrees, with respect to the radial direction R, wherein the bend axis 58 is directed partly upwards as seen in the radially outwards direction. This angle of the bend axis 58 has the effect that a lower edge 60 of the low portion becomes angled upwards with an angle 61 as seen in the radially outwards direction, similar to the direction of the bend axis 58. This has the advantage of simplifying mounting of the magnetic mixer in an inwardly curved or generally concave or cylindrical interior surface of the wall 6 of the tank 4, because the lower edge 60 of the impeller blades 11 is thereby adapted in conformity with the inwardly curved or concave interior surface of the wall 6.

With reference to FIG. 5 again, for obtaining a desired axial intake flow into the impeller at least 70%, specifically at least 80%, and more specifically at least 90%, of the surface area (right-hatched) of the upper portion 13 of at least one blade 11, such as of each blade 11, is curved or angled in the intended direction of rotation 14 with an angle 56 in the range of 3-30 degrees, specifically 5-20 degrees, and more specifically 7-15 degrees, with respect to an axial plane that is parallel with the axial direction A and extends through a rotational axis 29 of the impeller 3.

In other words, at least one blade, such as each blade, has a front side and back side with respect to the intended rotary motion of the impeller 3, wherein at least 70%, specifically at least 80%, and more specifically at least 90%, of a surface area (right-hatched) of the upper portion 13 of the front side has a vector component 38 of a normal vector 37 directed downwards in the axial direction A.

Even if it may be desirable to have at least 90% of the total surface area of the upper portion 13 being curved or angled in the intended direction of rotation 14 with an angle 56 in the range of 3-30 degrees, as illustrated in the example embodiment of FIG. 5, other blade designs falling within the scope of the disclosure may have merely 70% of the surface area (right-hatched) of the upper portion 13 curved or angled in the intended direction of rotation 14 with an angle 56 in the range of 3-30 degree. This level of surface area and inclination is deemed sufficient for providing the desired axial flow at the entry of the impeller 3.

Furthermore, for obtaining a desired radial outlet flow at the bottom side of the impeller 3 at least 70%, specifically at least 80%, and more specifically at least 90%, of the surface area (left-hatched) of the lower portion 33 of at least one blade 11, such as of each blade 11, is curved or angled in the intended direction of rotation with an angle 57 in the range of 10-60 degrees, specifically 20-50 degrees, and more specifically 30-40 degrees, with respect to an axial plane that is parallel with the axial direction A and extends through a rotational axis 29 of the impeller 3.

In other words, at least one blade, such as each blade, has a front side and back side with respect to the intended rotary motion of the impeller 3, wherein at least 70%, specifically at least 80%, and more specifically at least 90%, of a surface area (left-hatched) of the lower portion 33 of the front side has a vector component 43 of a normal vector 42 directed upwards in the axial direction A.

As indicated above, even if it may be desirable to have at least 90% of the total surface area of the lower portion 33 being curved or angled in the intended direction of rotation 14 with an angle 57 in the range of 10-60 degrees, as illustrated in the example embodiment of FIG. 5, other blade designs falling within the scope of the disclosure may have merely 70% of the surface area (left-hatched) of the lower portion 33 curved or angled in the intended direction of rotation 14 with an angle 57 in the range of 10-60 degree. This level of surface area and inclination is deemed sufficient for providing the desired redirection of the axial flow into radial flow within the impeller 3.

An average blade width in the radial direction may be larger than 20%, specifically larger than 25%, and more specifically larger than 30%, of a maximal outer diameter 55 of the drive rotor 9. The average blade width in the radial direction may be determined by dividing the total front side blade surface in a large set of axial sections 71, wherein each axial section 71 extends over the complete radial extension of the blade but merely having a small axial extension, and thereafter determining the blade width of each axial section 71, i.e. the radial length 52 of each individual axial section 71, and finally calculating an average blade width, i.e. average radial extension 52. An example of an axial section 71 is showed in the right-side blade 11 in FIG. 9.

Furthermore, a ratio between the maximal radial extension 52 of the blades and the total axial length 50 of the blade 11 may be in the range of 0.4-1.2, specifically 0.5-1.0, and more specifically 0.6-0.8.

These dimensions typically correspond to a low shear magnetic mixer with focus on agitation and mixing of the fluid within the tank 4.

Figure 8:
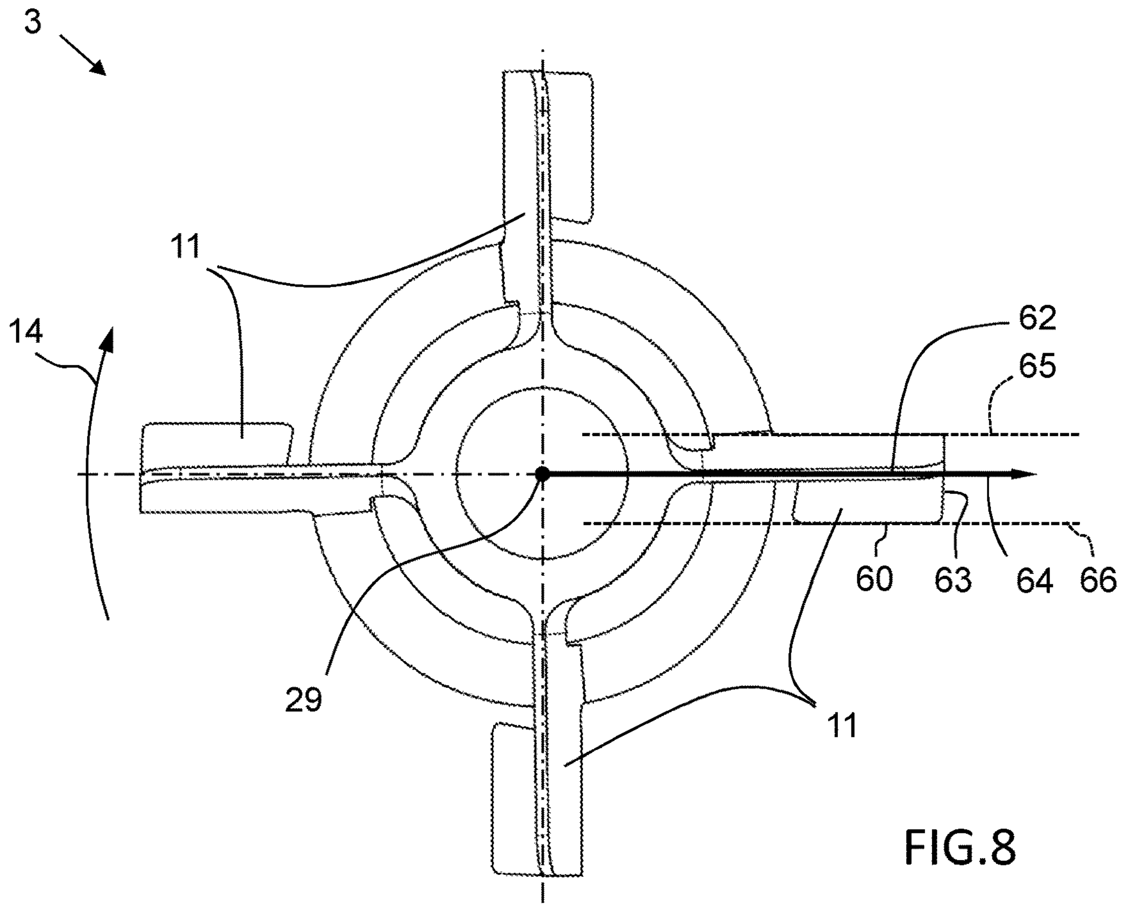
FIG. 8 shows a schematic top view of an example embodiment of the impeller.

FIG. 8 schematically shows a top view of the impeller 3 having four blades 11 and intended clockwise direction of rotation 14 around the rotational axis 29. With reference to FIG. 5 and FIG. 8, an upper edge 62 of at least one blade 11, such as of each blade 11, extends substantially in a radial plane of the impeller, and a radially outer edge 63 of a rotational outline of the blade 11, such as of each blade 11, is substantially parallel with the axial direction A.

A radial plane is oriented perpendicular to the axial direction A. Moreover, a rotational outline of a blade 11 corresponds to the rotational shape of the blade, i.e. a rotational-symmetric shape defined by the blade upon rotating a complete 360 degrees turn around the rotational axis 29 of the impeller 3.

Further, with reference to FIG. 8, at least a part of the upper portion 13 of at least one blade 11, such as of each blade 11, extends in the radial direction R of the impeller 3. This means that at least part of the upper portion is aligned with a vector 64 extending in the radial direction R and through the rotational axis 29 of the impeller 3.

More in detail, at least 75%, specifically at least 90% of an axial section 71 of the upper portion 13 of at least one blade 11, such as of each blade 11, extends in the radial direction R of the impeller 3, i.e. aligned with a vector 64 extending in the radial direction R and through the rotational axis 29 of the impeller 3. An example of an axial section 71 is showed in the right side blade in FIG. 9.

In FIG. 8, the full radial length of the upper edge 62 of at least one blade 11, such as of each blade 11, extends in the radial direction R of the impeller 3.

According to one example embodiment, also part of the lower portion 33 of at least one blade 11, such as of each blade 11, may extend in parallel with the radial direction of the impeller 3.

More in detail, at least 75%, specifically at least 90% of an axial section 71 of the lower portion 33 of at least one blade 11, such as of each blade 11, extends in the radial direction R of the impeller 3, i.e. aligned with a vector 64 extending in the radial direction R and through the rotational axis 29 of the impeller 3.

By having at least a part of the upper portion 13 of at least one blade 11, such as of each blade 11, or alternatively also part of the lower portion 33 of at least one blade 11, such as of each blade 11, extending in the radial direction of the impeller 3 a strong axial and radial pumping and mixing effect may be accomplished by the impeller because the radial extension of the blade 11, such as of each blade 11, is maximised.

Even further improved pumping and mixing effect is accomplished by having essentially planar blades 11, i.e. wherein each of the upper and lower portions 13 of the blade 11 is flat. This is visualised in FIG. 8, which shows that a line 65 aligned with the bend axis 58 is parallel with the vector 64, as seem from the top, and that a line 66 that is aligned with the lower edge 60 of the lower portion 33 is also parallel with the vector 64, as seen from the top.

The angle 67 between the planar upper portion 13 and planar lower portion 33 may be in the range of 120-170 degrees, specifically 125-145 degrees.

Figure 9:
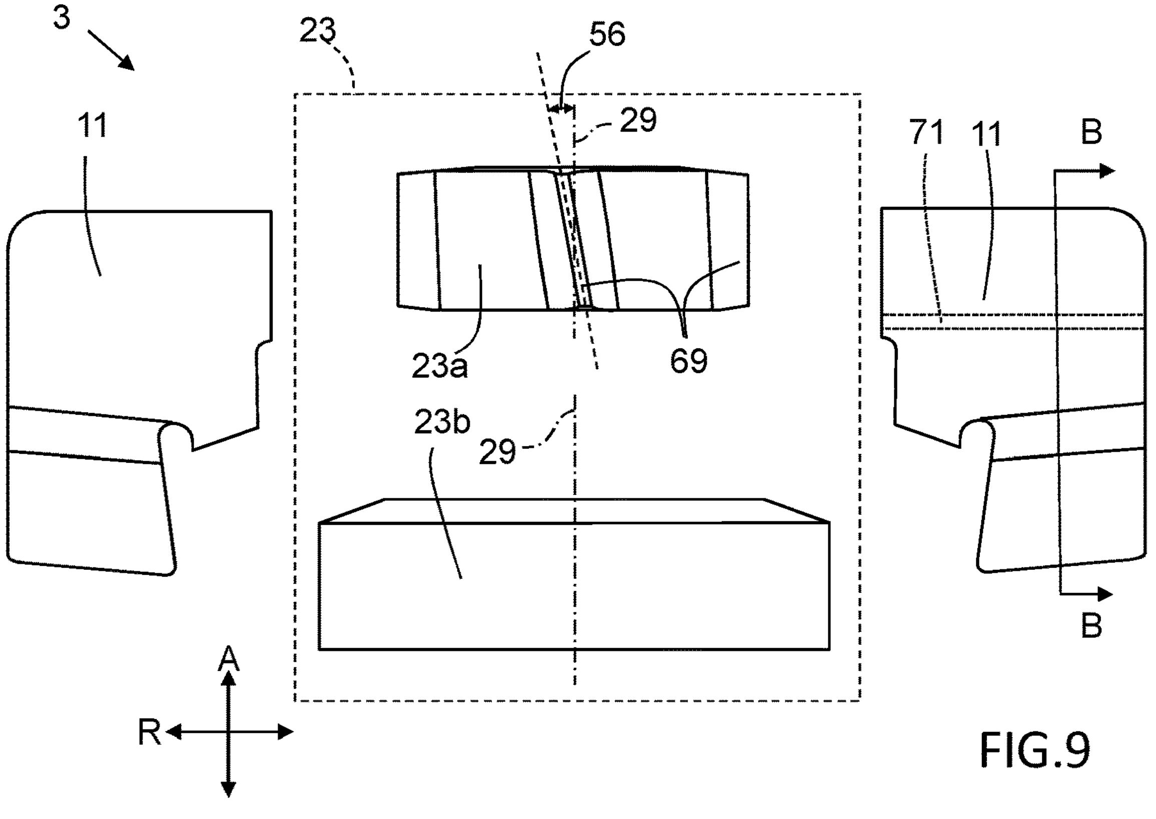
FIG. 9 shows a schematic exploded view of the parts of the impeller according to an example embodiment of the disclosure.

More in detail, at least 70%, specifically at least 90%, of the upper portion 13 of at least one blade 11, such as of each blade 11, is planar. Furthermore, at least 70%, specifically at least 90%, of the lower portion 33 of at least one blade 11, such as of each blade 11, is planar FIG. 9 shows an example embodiment of an exploded view of the impeller 3. The impeller may for example comprise a set of impeller blades 11 fastened to an impeller hub 23. In the example embodiment of FIG. 9, the hub 8 is made of two parts, namely an upper hub part 23*a* and a lower hub part 23*b*, as previously also illustrated in FIG. 2.

The upper and lower hub parts 23*a*, 23*b* are individual parts that are manufactured separately. The blades 11, which are also manufactured individually and separately, and subsequently attached to the upper and lower hub parts 23*a*, 23*b*, for example by welding. The blades 11 are welded to both the upper and lower hub parts 23*a*, 23*b*, thereby joining the upper and lower hub parts 23*a*, 23*b*.

The upper and lower hub parts 23*a*, 23*b* are consequently located spaced-apart in the axial direction A in the finished impeller 3, thereby enabling for example cleaning liquid good access to all surface area of the impeller 3 during cleaning.

The upper hub part 23*a* is configured to be mounted on the stub shaft 19 and the lower hub part 23*b*, which includes the second magnet array 12, is configured to be mounted around the cylindrical casing 8 of the drive mount 7.

The blades 11 may for example be manufactured by first stamping or otherwise forming flat blade materials from a sheet metal supply. Subsequently, the blade material is bent along the bend axis 58 to finalise the blade 11. The planar shape of the upper and lower portions 13, 33 in combination with a single bent thus enables a very cost-efficient manufacturing of the blades 11.

The metal blade are subsequently attached to the impeller hub 23, for example by welding.

With reference to FIG. 5, the lower portion 33 of the blades are free from attachment to the impeller hub. This has the advantage of avoiding welding in the direct vicinity of the second magnet array 12 of the impeller 3, because welding at this location would heat the magnets beyond a maximal temperature level. Instead, the upper portion 13 of the blade is attached, for example be welding, to a top surface of the lower hub part 23*b*, which top surface is further spaced apart from the second magnet array 12.

The upper hub part 23*a* is provided with radially protruding elongated attachment areas 69 that are inclined with respect to the axial direction A. Specifically, the attachment areas are elongated and oriented at an angle 56 in the range of 3-30 degrees, specifically 5-20 degrees, and more specifically 7-15 degrees, with respect to an axial plane that is parallel with the axial direction A and extends through a rotational axis 29 of the impeller 3.

FIG. 10 shows the example embodiment of the upper hub part 23*a*.

FIG. 11 shows a cross-section of a blade 11 along cut B-B in FIG. 9. The substantially planar upper and lower portions 13, 33 with the border line 32 are illustrated in FIG. 11.

FIG. 12 shows a corresponding cross-section of an alternative example embodiment of the blades, wherein the upper and lower portions 13, 33 of at least one blade 11, such as of each blade 11, have a more curved shape in the intended direction of rotation, thereby contributing to moving liquid axially downwards during impeller rotation.

FIG. 13 shows a corresponding cross-section of still an alternative example embodiment of the blades 11, wherein the upper and lower portions 13, 33 of at least one blade 11, such as of each blade 11, have a planar shape angled in the intended direction of rotation, but with a ratio between the axial length 49 of the upper portion 13 and the axial length 51 of the lower portion 33 of about 3.0, and with a less inclined upper portion 13. In other words a blade 11 that has a relatively long upper portion 13 compared with the lower portion 33.

Many other shapes, dimensions and geometries of the blades are possible within the scope of the claims.

Although the disclosure has been described in relation to specific combinations of components, it should be readily appreciated that the components may be combined in other configurations as well which is clear for the skilled person when studying the present application. Thus, the above description of the example embodiments of the present disclosure and the accompanying drawings are to be regarded as a non-limiting example of the disclosure and the scope of protection is defined by the appended claims. Any reference sign in the claims should not be construed as limiting the scope.

The term "coupled" is defined as connected, although not necessarily directly, and not necessarily mechanically.

The use of the word "a" or "an" in the specification may mean "one," but it is also consistent with the meaning of "one or more" or "at least one." The term "about" means, in general, the stated value plus or minus 10%, or more specifically plus or minus 5%. The use of the term "or" in the claims is used to mean "and/or" unless explicitly indicated to refer to alternatives only.

The terms "comprise", "comprises" "comprising", "have", "has", "having", "include", "includes", "including" are open-ended linking verbs. As a result, a method or device that "comprises", "has" or "includes" for example one or more steps or elements, possesses those one or more steps or elements, but is not limited to possessing only those one or more elements.

The invention claimed is:

1. Magnetically-coupled liquid mixer having an axial direction and a radial direction and comprising:

a drive mount configured to be secured to a wall of a mixing tank and having a stationary closed-end cylindrical casing arranged in the axial direction and configured for protruding into the tank, a tank-external drive rotor having a rotatable first magnet array and configured to be inserted in the cylindrical casing, a member mounted on a centrally located upstanding part of the cylindrical casing in an assembled state of the mixer, the member including a cylindrical part extending in the axial direction and surrounding the centrally located upstanding part of the cylindrical casing and a flange projecting radially outwardly away from a lower end of the cylindrical part;

a bearing that includes a cylindrical part extending in the axial direction and surrounding the cylindrical part of the member, the bearing also including a flange projecting radially outwardly away from a lower end of the cylindrical part of the bearing, the flange of the bearing having a lower surface configured to face towards the cylindrical casing in the assembled state of the mixer, the flange of the bearing extending radially outwardly farther than the flange of the member so that a part of the lower surface of the flange of the bearing positioned radially outwardly of the flange of the member is exposed;

an impeller configured for being rotatably-mounted on the cylindrical casing in the assembled state of the mixer so that the impeller is rotatable about a rotational axis, the impeller including an impeller hub and a plurality of radially extending blades fixed to and projecting radially away from the impeller hub, the impeller being rotatably-mountable on the cylindrical casing, with the member and the bearing interposed between the impeller hub and the cylindrical casing, so that an inner surface of the impeller hub faces towards an outer surface of the cylindrical part of the bearing;

the impeller also including a second magnet array, wherein the first and second magnet arrays in the assembled state of the mixer are configured for enabling rotary torque to be transferred from the drive rotor to the impeller by magnetic coupling between the first and second magnet arrays to rotate the impeller in an intended direction of rotation about the rotational axis of the impeller, the first and second magnet arrays being arranged to provide a magnetic coupling that ensures levitation of the impeller at all times;

each blade being divided, in the axial direction, by a border line into an upper portion and a lower portion, the lower portion being configured to be located closer to the drive rotor and the upper portion being configured to be further away from the drive rotor in the axial direction, and wherein the upper portion of at least one of the blades is curved or angled in the intended direction of rotation, thereby contributing to moving liquid axially downwards during impeller rotation.

2. Liquid mixer according to claim 1, wherein an upper end of the upper portion of said at least one of the blades is located further forwards in the intended direction of rotation than a lower end of the upper portion.

3. Liquid mixer according to claim 1, wherein the lower portion of said at least one of the blades is also curved or angled in the intended direction of rotation, thereby contributing to changing the flow direction of the liquid from axially downwards to radially outwards when passing through the impeller.

4. Liquid mixer according to claim 1, wherein a surface area ratio between the upper and lower portions of said at least one of the blades is in the range of 1-5.

5. Liquid mixer according to claim 1, wherein at least 70% of a surface area of the upper portion of said at least one of the blades is curved or angled in the intended direction of rotation with an angle in the range of 3-30 degrees, with respect to an axial plane that is parallel with the axial direction and extends through the rotational axis of the impeller.

6. Liquid mixer according to claim 1, wherein at least 70%, of a surface area of the lower portion of said at least one of the blades is curved or angled in the intended direction of rotation with an angle in the range of 10-60 degrees, with respect to an axial plane that is parallel with the axial direction and extends through the rotational axis of the impeller.

7. Liquid mixer according to claim 1, wherein the blades are made of sheet metal and welded to an impeller hub.

8. Liquid mixer according to claim 1, wherein the lower portion of the blades are free from attachment to the impeller hub.

9. Liquid mixer according to claim 1, wherein said at least one of the blades is bent along a straight bend axis defining an angle in the range of +/−40 degrees with respect to the radial direction.

10. Liquid mixer according to claim 1, wherein said at least one of the blades has a single bend.

11. Liquid mixer according to claim 1, wherein at least a part of the upper portion of said at least one of the blades extends in the radial direction.

12. Liquid mixer according to claim 1, wherein upper edges of the blades extend substantially in a radial plane of the impeller, and wherein radially outer edges of rotational outlines of the blades are substantially parallel with the axial direction.

13. Liquid mixer according to claim 1, wherein said at least one of the blades has a front side and back side with respect to an intended rotary motion of the impeller, wherein at least 70% of a surface area of the upper portion of the front side has a vector component of a normal vector directed downwards in the axial direction.

14. Liquid mixer according to claim 1, wherein an average radial extension of said at least one of the blades is larger than 20% of a maximal outer diameter of the drive rotor.

15. Magnetically-coupled liquid mixer having an axial direction and a radial direction and comprising:

a drive mount configured to be secured to a wall of a mixing tank and having a stationary closed-end cylindrical casing arranged in the axial direction and configured to protrude into the tank;

a tank-external drive rotor positioned in the cylindrical casing and having a rotatable first magnet array that is rotatable about a rotational axis, the rotational axis passing through the closed-end of the cylindrical casing;

a member mounted on a centrally located upstanding part of the cylindrical casing in an assembled state of the mixer, the member including a cylindrical part extending in the axial direction and surrounding the centrally located upstanding part of the cylindrical casing and a flange projecting radially outwardly away from a lower end of the cylindrical part;

a bearing that includes a cylindrical part extending in the axial direction and surrounding the cylindrical part of the member, the bearing also including a flange projecting radial outwardly away from a lower end of the cylindrical part of the bearing, the flange of the bearing having a lower surface configured to face towards the cylindrical casing in the assembled state of the mixer, the flange of the bearing extending radially outwardly farther than the flange of the member so that a part of the lower surface of the flange of the bearing positioned radially outwardly of the flange of the member is exposed;

an impeller rotatably-mounted on the cylindrical casing in the assembled state of the mixer so that the impeller is rotatable to rotate about the rotational axis, the impeller including an impeller hub and a plurality of radially extending blades fixed to and projecting radially away from the impeller hub, the impeller being rotatably-mountable on the cylindrical casing, with the member and the bearing interposed between the impeller hub and the cylindrical casing, so that an inner surface of the impeller hub faces towards an outer surface of the cylindrical part of bearing; and the impeller also including a second magnet array, the first and second magnet arrays being configured to enable rotary torque to be transferred from the drive rotor to the impeller by magnetic coupling between the first and second magnet arrays to rotate the impeller in a rotation direction about the rotational axis, each of the blades of the impeller having a front surface facing in the rotation direction and an opposite back surface;

each blade being divided, in the axial direction, by a border line into an upper portion and a lower portion, the lower portion being closer to the drive rotor in the axial direction and the upper portion being further from the drive rotor in the axial direction; and the upper portion of at least a first one of the blades being curved or angled so that the front surface of the upper portion of the first blade has a normal vector that is composed of both a first vector component directed downwards toward the lower portion of the first blade in the axial direction and a second vector component perpendicular to the first vector component and directed forwards in the rotation direction so that the curved or angled upper portion of the first blade contributes to moving liquid axially downwards during impeller rotation, the first and second vector components both having a magnitude other than zero.

16. Liquid mixer according to claim 15, wherein an upper end of the upper portion of the first blade is located further forwards in the rotation direction than a lower end of the upper portion, the lower end of the upper portion of the first blade being closer to the border line than the upper end of the upper portion of the first blade.

17. Liquid mixer according to claim 16, wherein the lower portion of the first blade is also curved or angled so that the front surface of the lower portion of the first blade has a normal vector that is composed of both a first vector component directed upwards toward the upper portion of the first blade in the axial direction and a second vector component perpendicular to the first vector component and directed forwards in the rotation direction to contribute to changing the flow direction of the liquid from axially downwards to radially outwards when passing through the impeller.

18. Magnetically-coupled liquid mixer having an axial direction and a radial direction and comprising:

a drive mount configured to be secured to a wall of a mixing tank and having a stationary closed-end cylindrical casing arranged in the axial direction and configured to protrude into the tank;

a tank-external drive rotor having a first magnet array and positionable in the cylindrical casing, the drive rotor being connectable to a rotary power source so that rotary torque produced by the rotary power source rotates the drive rotor together with the first magnet array;

a member mounted on a centrally located upstanding part of the cylindrical casing in an assembled state of the mixer, the member including a cylindrical part extending in the axial direction and surrounding the centrally located upstanding part of the cylindrical casing and a flange projecting radially outwardly away from a lower end of the cylindrical part;

a bearing that includes a cylindrical part extending in the axial direction and surrounding the cylindrical part of the member, the bearing also including a flange projecting radially outwardly away from a lower end of the cylindrical part of the bearing, the flange of the bearing having a lower surface configured to face towards the cylindrical casing in the assembled state of the mixer, the flange of the bearing extending radially outwardly farther than the flange of the member so that a part of the lower surface of the flange of the bearing positioned radially outwardly of the flange of the member is exposed;

an impeller that includes a hub rotatably mountable on the cylindrical casing, a plurality of blades radially extending from the hub and a second magnet array in the hub, the hub of the impeller being rotatably-mountable on the cylindrical casing, with the member and the bearing interposed between the impeller hub and the cylindrical casing, so that an inner surface of the impeller hub faces towards an outer surface of the cylindrical part of the bearing;

the first and second magnet arrays being configured to enable the rotary torque to be transferred from the drive rotor to the impeller by the magnetic coupling between the first and second magnet arrays when the impeller is mounted on the cylindrical casing and the drive rotor is connected to the rotary power source to rotate the impeller in a rotation direction about a rotational axis that passes through the closed-end of the cylindrical casing, each of the blades of the impeller having a front surface facing in the rotation direction and an opposite back surface, the hub having an open lower end that receives the cylindrical casing when the hub is rotatably mounted on the cylindrical casing;

each blade being divided, in the axial direction, by a border line into an upper portion and a lower portion, the lower portion being closer to the lower end of the hub in the axial direction and the upper portion being further from the lower end of the hub in the axial direction; and the upper portion of at least a first one of the blades being curved or angled so that, as seen in a side view of the impeller, the front surface of the upper portion of the first blade forms an angle greater than 0° with respect to an axial plane that: i) is parallel with the axial direction; ii) contains the rotational axis of the impeller; and iii) intersects the first blade.

19. Liquid mixer according to claim 18, wherein an upper end of the upper portion of the first blade is located further forwards in the rotation direction than a lower end of the upper portion, the lower end of the upper portion of the first blade being closer to the border line than the upper end of the upper portion of the first blade.

20. Liquid mixer according to claim 19, wherein the lower portion of the first blade is configured so that, as seen in a side view of the impeller, the front surface of the lower portion of the first blade forms an angle greater than 0° with respect to an axial plane that: i) is parallel with the axial direction; ii) contains the rotational axis of the impeller; and iii) intersects the first blade to contribute to changing the flow direction of the liquid from axially downwards to radially outwards when passing through the impeller.

* * * * *